US009463725B2

(12) United States Patent
Szczygiel et al.

(10) Patent No.: US 9,463,725 B2
(45) Date of Patent: Oct. 11, 2016

(54) COMFORT HEADREST (71) Applicant: AISIN TECHNICAL CENTER OF AMERICA, INC., Plymouth, MI (US)

(72) Inventors: Lindsey Szczygiel, Pinckney, MI (US); Mike Howlett, Troy, MI (US); Eric Archambeau, Canton, MI (US); Katsuhiko Takeuchi, Canton, MI (US)

(73) Assignee: AISIN TECHNICAL CENTER OF AMERICA, INC., Plymouth, MI (US)

( * ) Notice: Subject to any disclaimer, the term of this patent is extended or adjusted under 35 U.S.C. 154(b) by 28 days.

(21) Appl. No.: 14/243,383

(22) Filed: Apr. 2, 2014

(65) Prior Publication Data
US 2014/0300168 A1    Oct. 9, 2014

Related U.S. Application Data (60) Provisional application No. 61/807,979, filed on Apr. 3, 2013.

(51) Int. Cl.
*B60N 2/48* (2006.01)

(52) U.S. Cl.
CPC .................. *B60N 2/4882* (2013.01)

(58) Field of Classification Search
CPC ..... B60N 2/48; B60N 2/4805; B60N 2/4882
See application file for complete search history.

(56) References Cited

U.S. PATENT DOCUMENTS

| 5,806,933 | A  | * | 9/1998  | Tsui ......................... A47C 7/38 |
|           |    |   |         | 297/216.12 |
| 6,220,668 | B1 | * | 4/2001  | Scheffzuck ................... 297/391 |
| 6,305,749 | B1 | * | 10/2001 | O'Connor et al. ............ 297/397 |
| 6,513,871 | B2 | * | 2/2003  | Bartels ...................... 297/216.12 |
| 6,761,403 | B2 | * | 7/2004  | Pal ......................... B60N 2/427 |
|           |    |   |         | 297/216.12 |
| 7,131,698 | B2 |   | 11/2006 | Dowty et al. |
| 7,144,083 | B2 |   | 12/2006 | List et al. |
| 7,717,517 | B2 |   | 5/2010  | Yamane et al. |
| 2009/0302660 | A1 | * | 12/2009 | Karlberg et al. ............. 297/404 |

* cited by examiner

*Primary Examiner* — Philip Gabler
(74) *Attorney, Agent, or Firm* — Oblon, McClelland, Maier & Neustadt, L.L.P.

(57) ABSTRACT

A vehicle headrest, including two side wings at opposite ends of the headrest that rotate around respective axes; and a locking mechanism that locks each of the side wings, and backwards movement is restricted by the locking mechanism when each side member is rotated around the respective axis.

8 Claims, 12 Drawing Sheets

COMFORT HEADREST

BACKGROUND OF THE INVENTION

1. Field of the Invention

Exemplary aspects of the present invention relate to a headrest of a vehicle to increase the comfort of a user during prolonged use.

2. Description of the Related Art

Seats of a vehicle such as an automobile are provided with a headrest for the safety and comfort of an occupant (user). The headrest provides protection to the occupant in the event of a crash by helping to prevent head, neck, or spinal injuries by limiting the rearward movement of the occupant's head. A headrest also provides comfort to a user by providing a place to rest one's head especially for a long drive.

Headrests may be provided in special arrangements to enhance the comfort of the user. For example, certain materials such as foam may be used to provide a soft cushion. Also, the shape of the headrest may be designed to enhance comfort. For example, U.S. Pat. No. 7,717,517 B2 describes a headrest that has side wings that pivot around fixed vertical shafts allowing the wings to rotate forward and backwards. However, U.S. Pat. No. 7,717,517 B2 has a drawback in that the side wings do not go all the way back, which does not give the appearance of a normal headrest when the side wings are not in use.

U.S. Pat. No. 7,144,083 B2 describes a headrest including a center portion and two side members. There are membrane hinges that attach the side members to the center portion and allow side members to pivot about the center portion. Further, U.S. Pat. No. 7,131,698 B2 describes a headrest that includes left and right side wings. The side wings are wedged shaped and are attached to center portion through a pivot. The wings can be adjusted to increase or decrease the amount of distance between the two side wings.

However, both U.S. Pat. No. 7,144,083 B2 and U.S. Pat. No. 7,131,698 B2 have a drawback in that the amount of area on the center portion where the head normally rests is greatly reduced when side members are rotated towards the user's head. Furthermore, creases in the headrest exist when the side members are flat and not rotated, which can cause discomfort to the user.

SUMMARY OF THE INVENTION

The present application is designed to address the above issues in the related art. In particular, a headrest according to an exemplary embodiment of the present application provides passengers with the convenience of a pillow like cushion that can be adjusted to a preferred angle providing extra comfort to passengers during long drives.

A vehicle headrest, including two side wings at opposite ends of the headrest that rotate around respective axes; and a locking mechanism that locks each of the side wings, and backwards movement is restricted by the locking mechanism when each side member is rotated around the respective axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE PREFERRED EMBODIMENTS

Referring now to the drawings, wherein like reference numerals designate identical or corresponding parts throughout the several views. Further, as used herein, the words "a," "an" and the like generally carry a meaning of "one or more," unless stated otherwise.

FIGS. 1-13 depict various aspects of a comfort headrest for a vehicle seat. Here a vehicle refers to a land vehicle exemplified by an automobile. However, the present disclosure is also applicable to any similar type vehicle, such as but not limited to, a sport utility vehicle, a pickup truck, a commercial vehicle or the like.

First Embodiment

Figure 1:
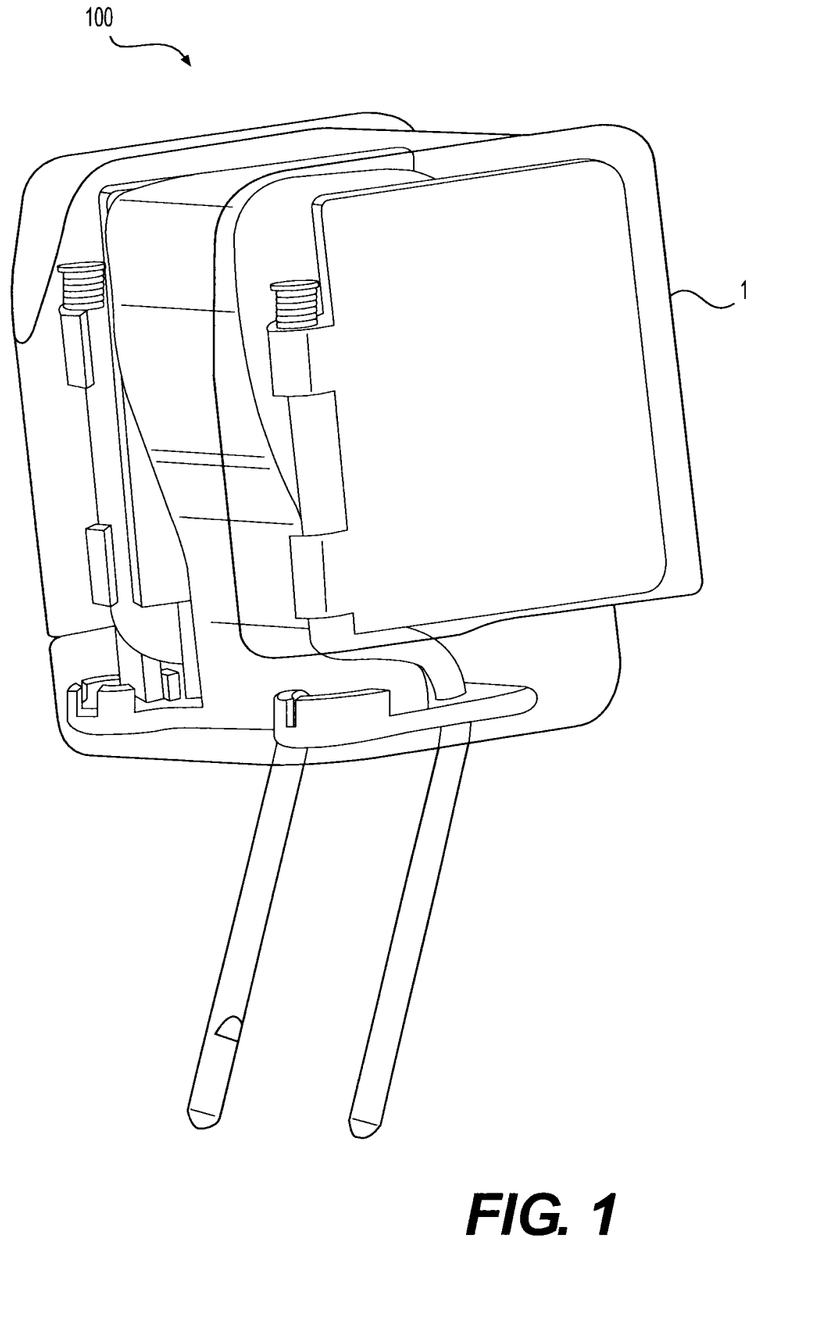
FIG. 1 illustrates an isometric view of a first embodiment of a comfort headrest assembly in accordance with the present disclosure.

FIG. 1 displays an isometric view of the assembled headrest 100 which includes a side wing 1. The headrest 100 includes a form which is transparent in this Figure. The structure within the headrest 100 will be described with respect to FIG. 2.

Figure 2:
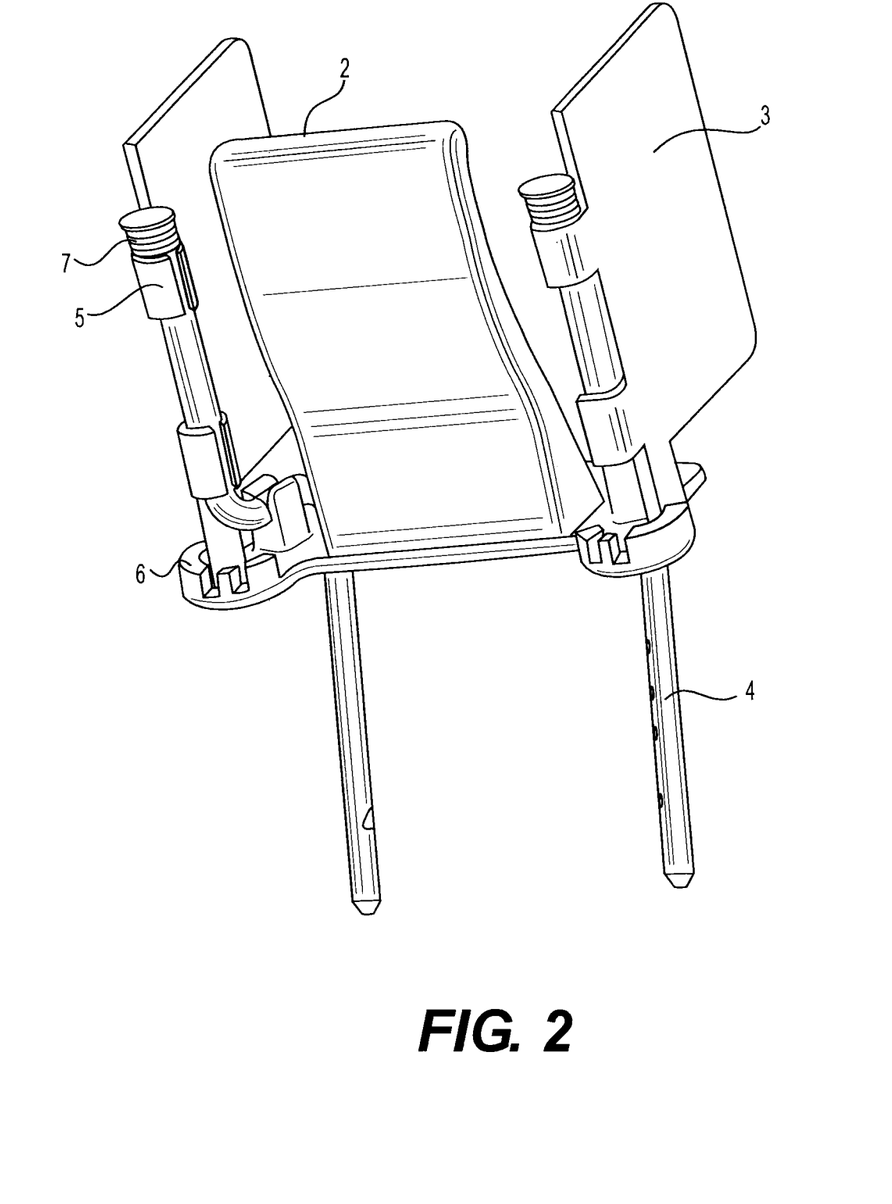
FIG. 2 illustrates a front view of a first embodiment of a comfort headrest assembly in accordance with the present disclosure.

FIG. 2 shows the interior structure of the headrest 100 and displays all of the functional parts. The interior structure of the headrest 100 includes a resin plate 2 for head impact, left and right side wing structures 3, a headrest post 4, attachment method 5 to attach the side wing structure to the headrest post 4, a locking mechanism 6, and two compression springs 7.

Figure 3:
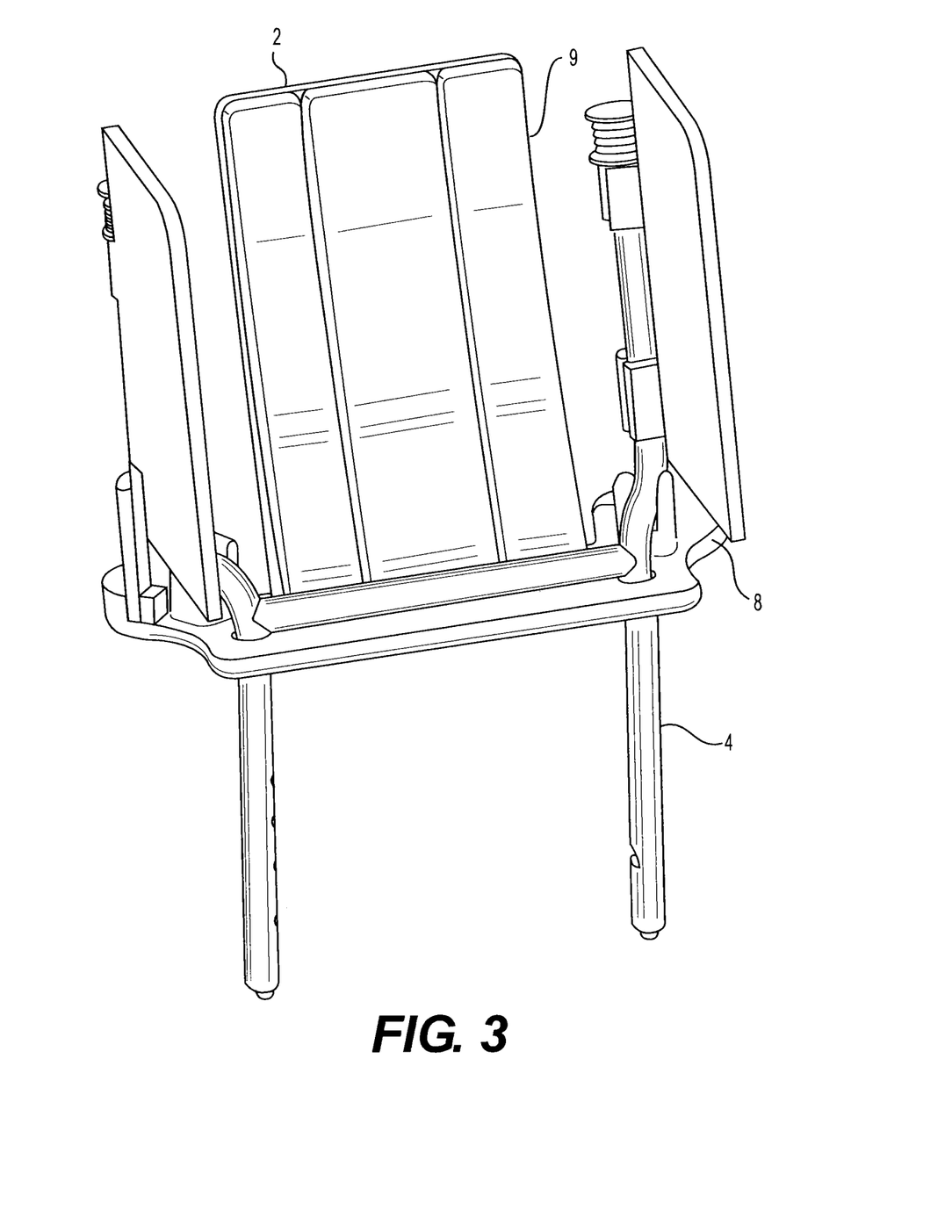
FIG. 3 illustrates a back view of a first embodiment of a comfort headrest assembly in accordance with the present disclosure.

The resin plate 2 is a resilient structure provides the primary head support of the headrest 100 Shown in FIG. 2 and FIG. 3, the resin plate 2 has a generally rectangular shape when viewed from a front direction. The resin plate 2 extends from a base 8 in a vertical direction as shown in FIG. 2. When viewed in profile, the resin plate 2 includes a deformation or wave that begins from the base 8 and extends backwards towards a rear of the headrest 100. Headrest posts 4 extend downward from the base 8 as shown in FIG. 2. The posts 4 are inserted into the vehicle seat and secure the headrest 100 to the seat (not illustrated). The posts 4 allow the head rest 1 to be adjusted in a vertical direction relative to a seat back of the seat (not illustrated). The posts 4 being provided with indentions for locking the headrest 100 at various heights.

The posts 4 also include a curved portion near the base 8 and a second extension that extends upward from the base 8 on the left and right side of the headrest 100. These portions of the posts 4 are provided generally parallel to and on each side of the resin plate 2. The posts 4 are also an axis of rotation of the wing structures 3. The wing structures 3 extend radially from the posts 4, and are attached to the posts 4 by attachments 5. FIGS. 2 and 3 illustrates two attachments per wing structure 3. The wing structures 3 and posts 4 providing the primary support of the side wing 1.

The side wing structures 3 rotate about the axis of the headrest posts 4. The side wing structure 3 is held in place by the force of a compression spring 7 provided between the top of the posts and one of the attachments 5. The wing structures 4 are also contained by locking mechanisms 6 provided at the base 8. The locking mechanism 6 lock the respective wing structures into one of several predefined positions.

To operate the side wings 1 the user has to clear the locking mechanism 6 height by lifting the wing structure 3 a predetermined height. This lifting motion overcomes a downward bias force exerted by the spring 7. The compression spring 7 keeps the side structure from moving up and down inadvertently. Once the wing structure has been lifted the predetermined height, the wing structure can rotate around the axis of the upper portion of post 4. The user can adjust the wing structure to be in one of several predefined positions such as the one shown in FIG. 7. Once the predetermined position is located by the wing structure 3, the bias force 7 will force the wing structure 3 to lock back into the locking mechanism 6.

FIG. 3 is the back view of the interior headrest structure of headrest 100. The resin plate for head impact 2 attaches to the headrest post 4 by the plate attachment base 8 located on the plate. The plate for head impact 2 has ribbed sections 9 in order to support head impact. FIG. 3 further illustrates the relationship between the posts 4 and the wing structures 5.

Figure 4:
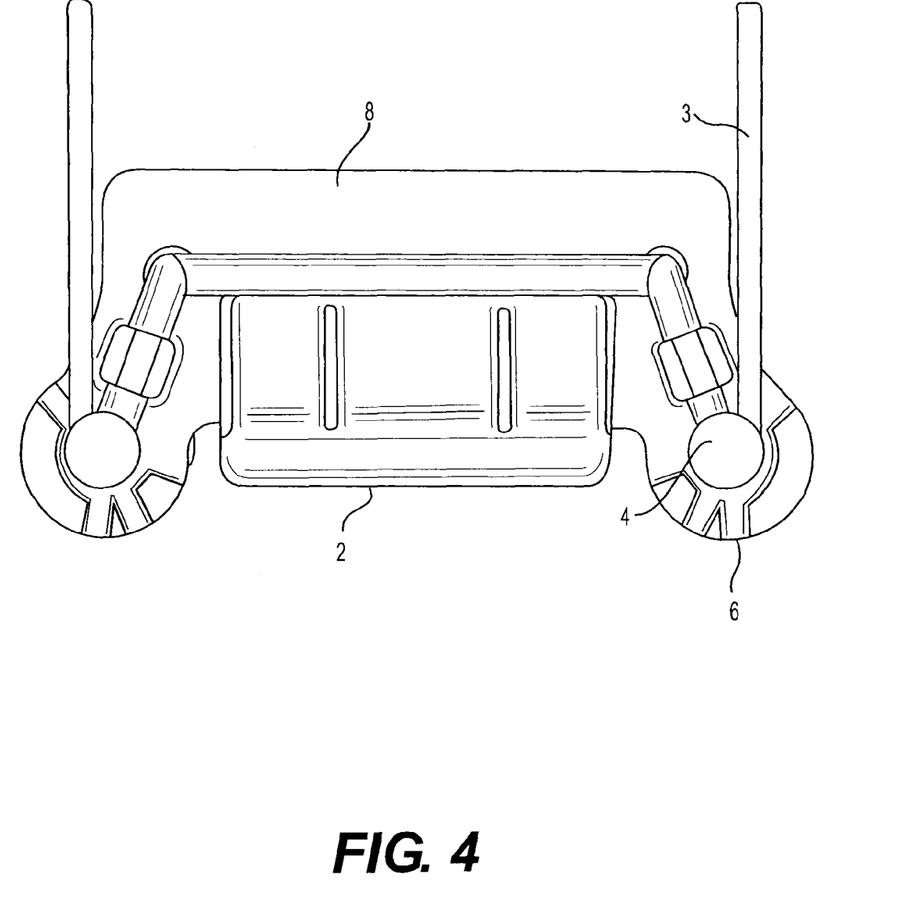
FIG. 4 illustrates a top view of a comfort first embodiment of a headrest assembly in accordance with the present disclosure.

FIG. 4 shows the top view of the headrest 100. Shown here are the predetermined locking positions of the locking mechanism 6. Also shown are the two Locking mechanisms 6 are provided on the left and right side of the base. The two vertical axes of the posts 4 and the generally horizontal portion of the posts 4.

Figure 5:
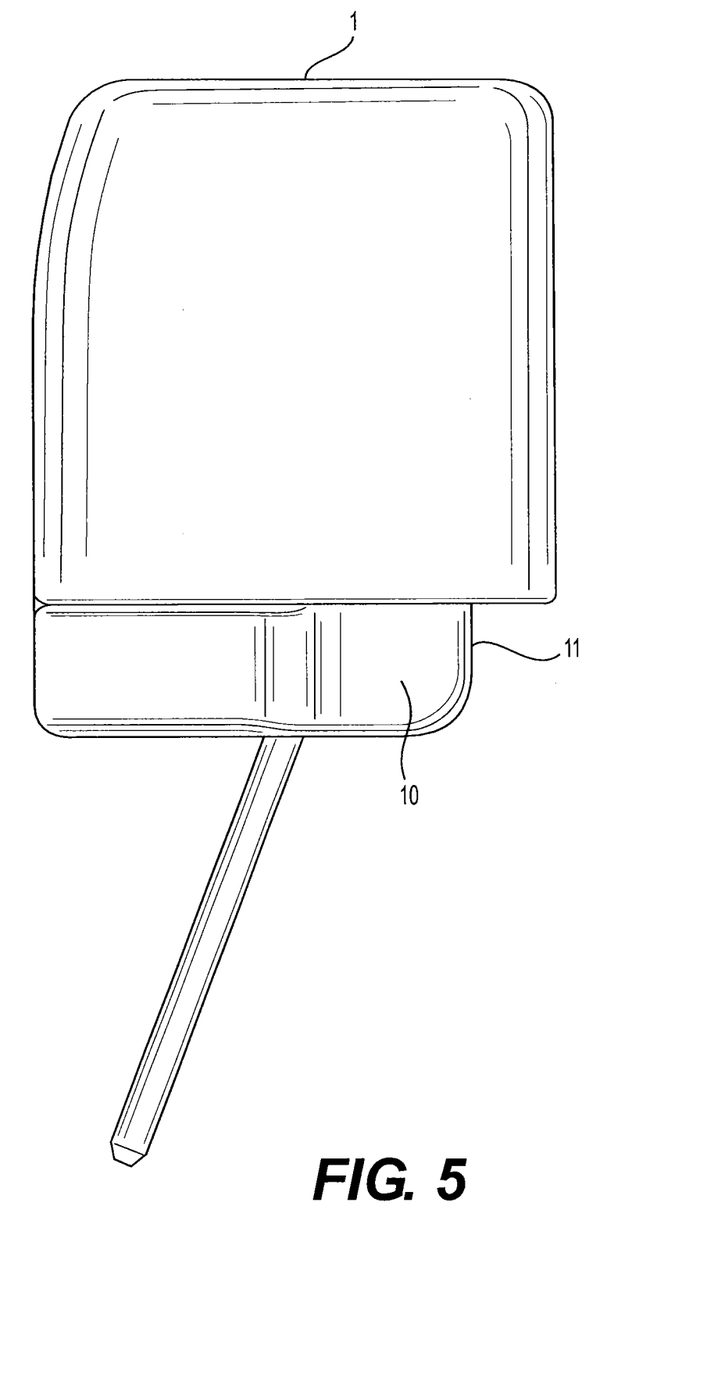
FIG. 5 illustrates a side view of a first embodiment of a comfort headrest assembly in accordance with the present disclosure.

FIG. 5 shows a side view of the headrest including the outer foam structure. The side wing 1 is rotated when the user grips pocket 10 to lift side wing 1 up. The side wing 1 is extended past the back part 11 of the center portion of the headrest to allow the user to rotate the side wing 1 around towards the users head. Internally, the lifting of the side wing 1 by the pocket 10 releases the wing structure 3 from the locking mechanism 6, described above.

Figure 6:
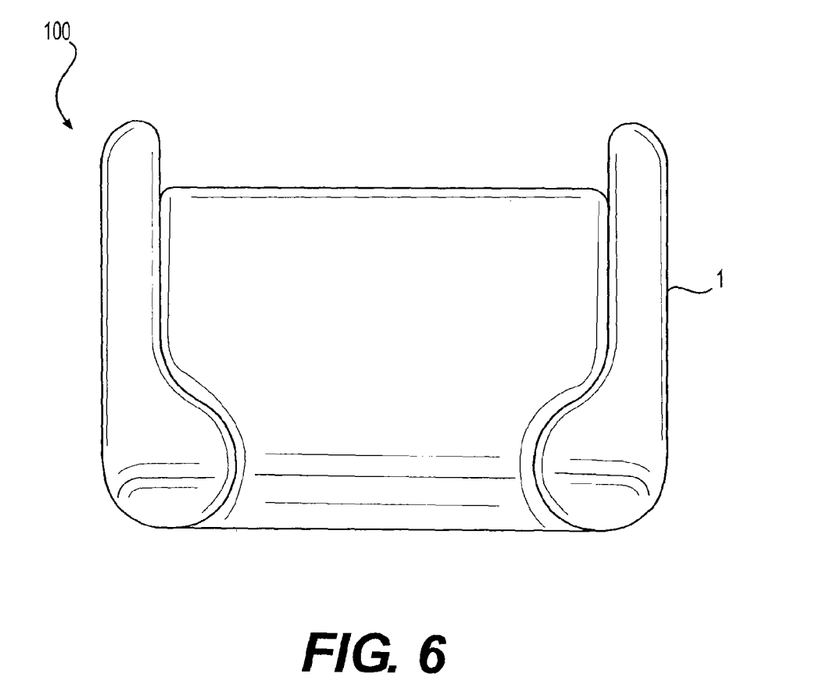
FIG. 6 illustrates a top view of a first embodiment of a comfort headrest assembly in accordance with the present disclosure.

FIG. 6 shows a top view of the headrest with the side wings 1 in the original, non-rotated position.

Figure 7:
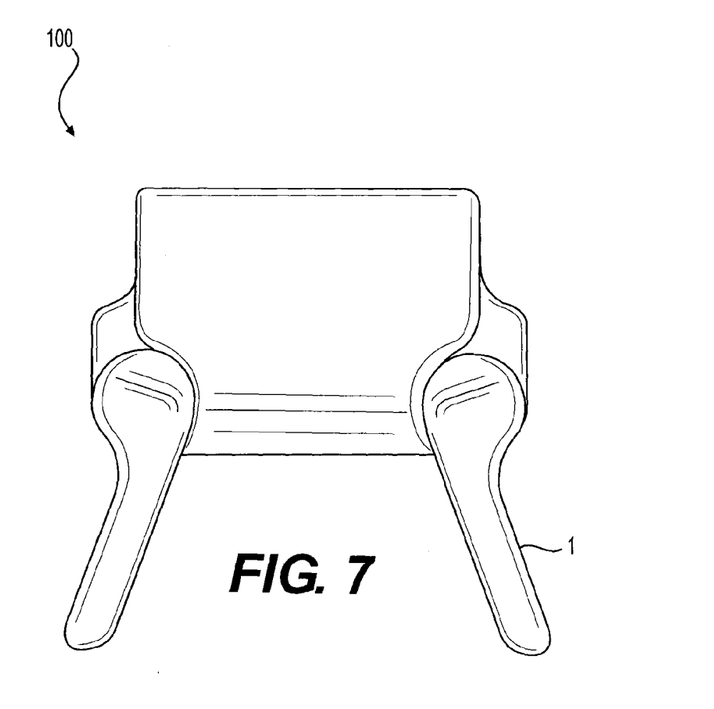
FIG. 7 illustrates a top view of a first embodiment of a comfort headrest assembly in accordance with the present disclosure.

FIG. 7 shows the top view of the headrest with the side wings 1 rotated to a predetermined position at 160° where user can then rest their head on the side wing.

Figure 8:
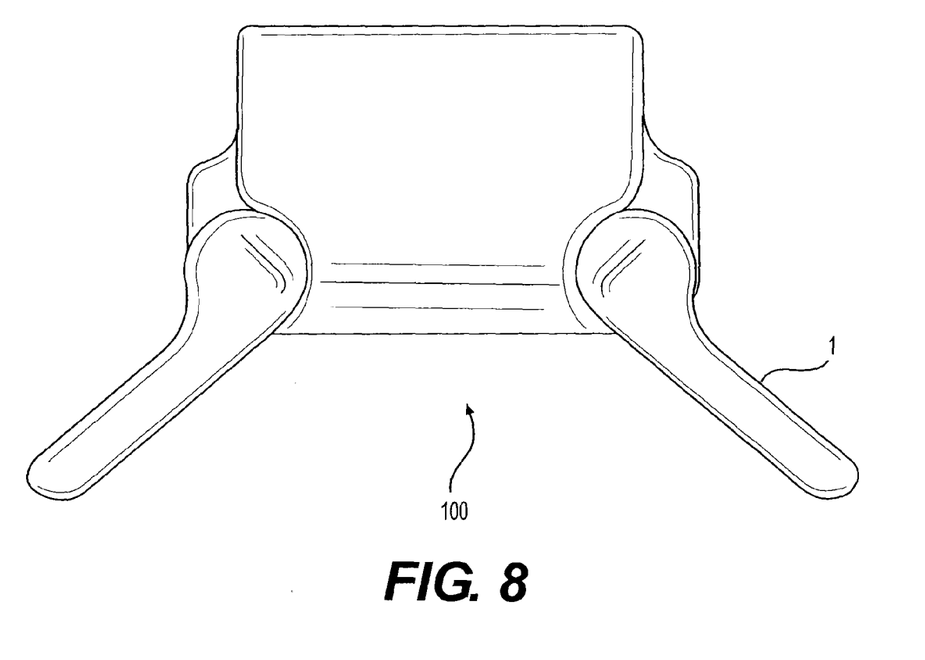
FIG. 8 illustrates a top view of a first embodiment of a comfort headrest assembly in accordance with the present disclosure.

FIG. 8 shows the top view of the headrest with the side wings 1 rotated to a predetermined position at 130° where user can then rest their head on the side wing 1. Each of the positions illustrated in FIG. 6-8 being a locked position as determined by the predefined positions of the locking mechanisms 6.

Thus, a comfort headrest in accordance with the present disclosure can provide comfort without having the shape of the headrest altered when the side wings aren't being used. When the side wings are not in use the headrest has normal shape without undue creases. When the user wants to utilize the side wings, the user can rotate each side wing separately, and the side wings of the headrest act as a pillow for passengers during long drives. The side wings not only provide comfort, but also extra support for the passenger's neck and head.

At least one advantage of the comfort headrest compared to existing adjustable headrests is that the width of the center portion of the headrest is maximized to accommodate the width the of passenger's head even when the side wings are rotated towards the front; providing additional comfort.

Second Embodiment

Figure 9:
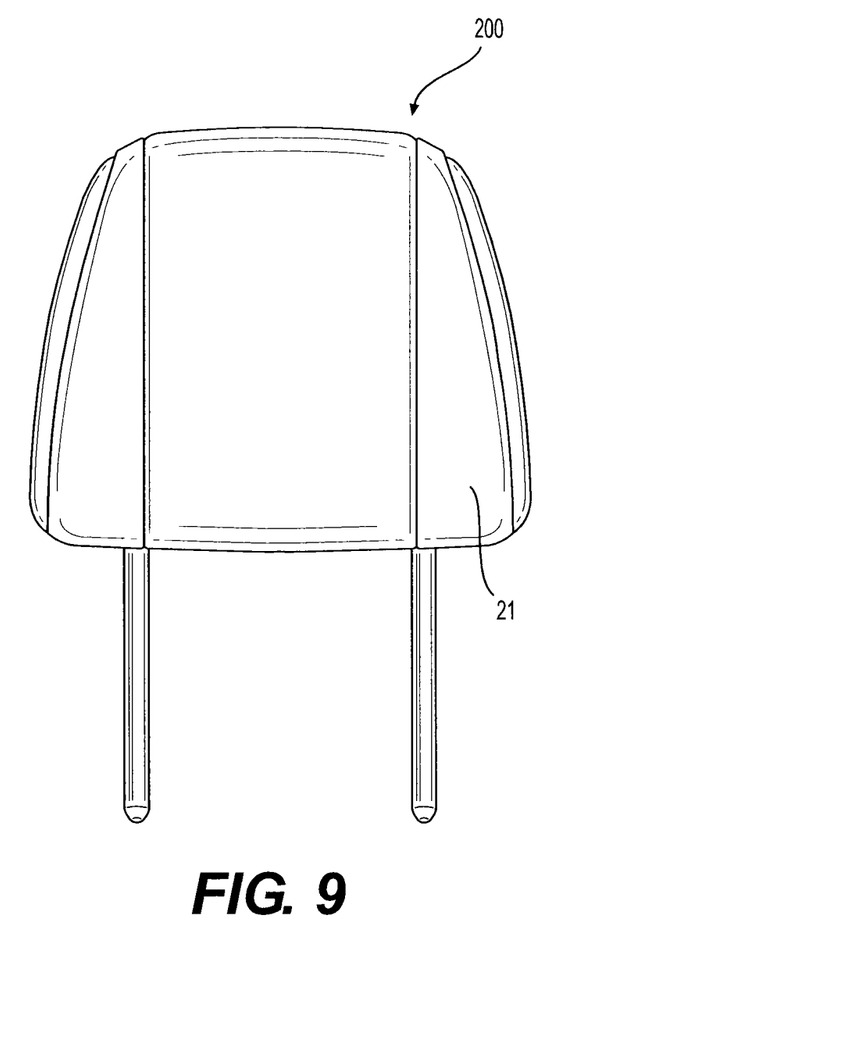
FIG. 9 illustrates a front view of a second embodiment of a comfort headrest assembly in accordance with the present disclosure.

A second embodiment is illustrated in FIGS. 9-13. The second embodiment includes a headrest 200. FIG. 9 illustrates a front view of the assembled headrest 200 which includes two side wings 21 that are flush with a front face when in the closed position.

Figure 10:
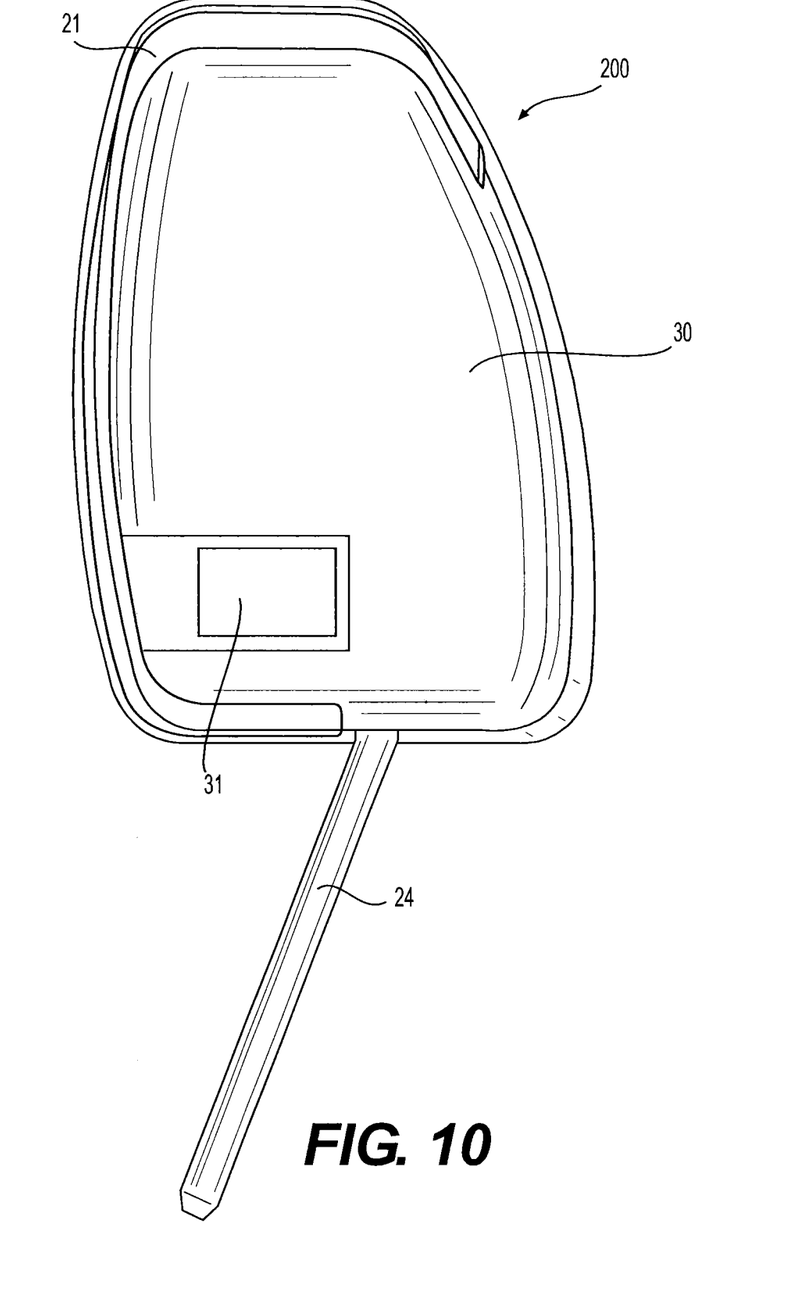
FIG. 10 illustrates a side view of a second embodiment of a comfort headrest assembly in accordance with the present disclosure.

FIG. 10 illustrates a side view of the headrest 200 which includes a side wall 30 to hide inner locking and rotating mechanisms that function the side wings 21. Also shown is a button 31 that is used to slide and rotate the side wing 21 out.

Similar to the first embodiment, the side wings 21 include side wing structures which rotate about axes of headrest posts 24. The side wings 21 are held in place by slide rail or rails that that extend and rotate the side wings 21. Specifically, side wings 21 slide forward after being released by the button 31 along the rails. Once the side wing 21 has cleared the front face of the headrest 200, side wings 21 are rotatable around the axes of the posts 24 to predetermined positions. Once the button 31 is no longer being operated, the side wing 21 will lock at the extended position beyond the front face of the headrest 200 and is rotatable. Operation of the button 31 allows the side wings 21 to be rotatable and slideable into the headrest 200.

Figure 11:
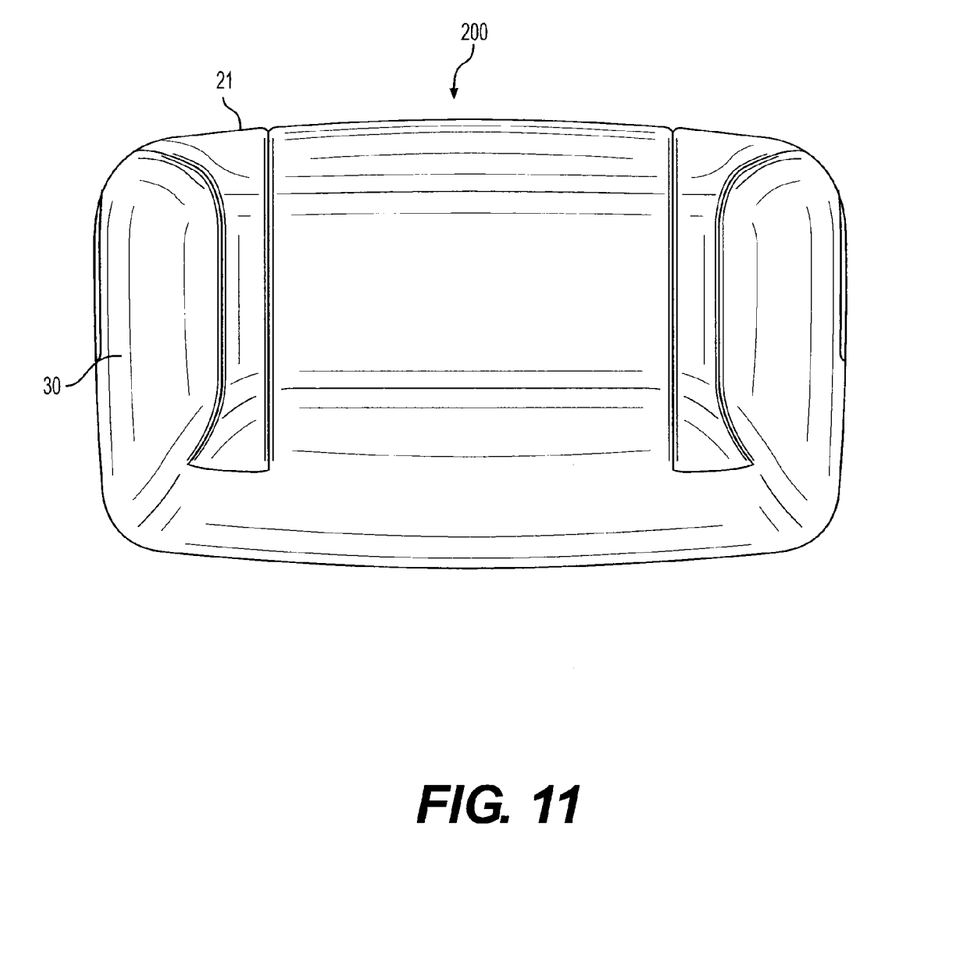
FIG. 11 illustrates a top view of a second embodiment of a comfort headrest assembly in accordance with the present disclosure.

FIG. 11 shows a top view of the headrest assembly 200 where the side wings 21 can be displayed.

Figure 12:
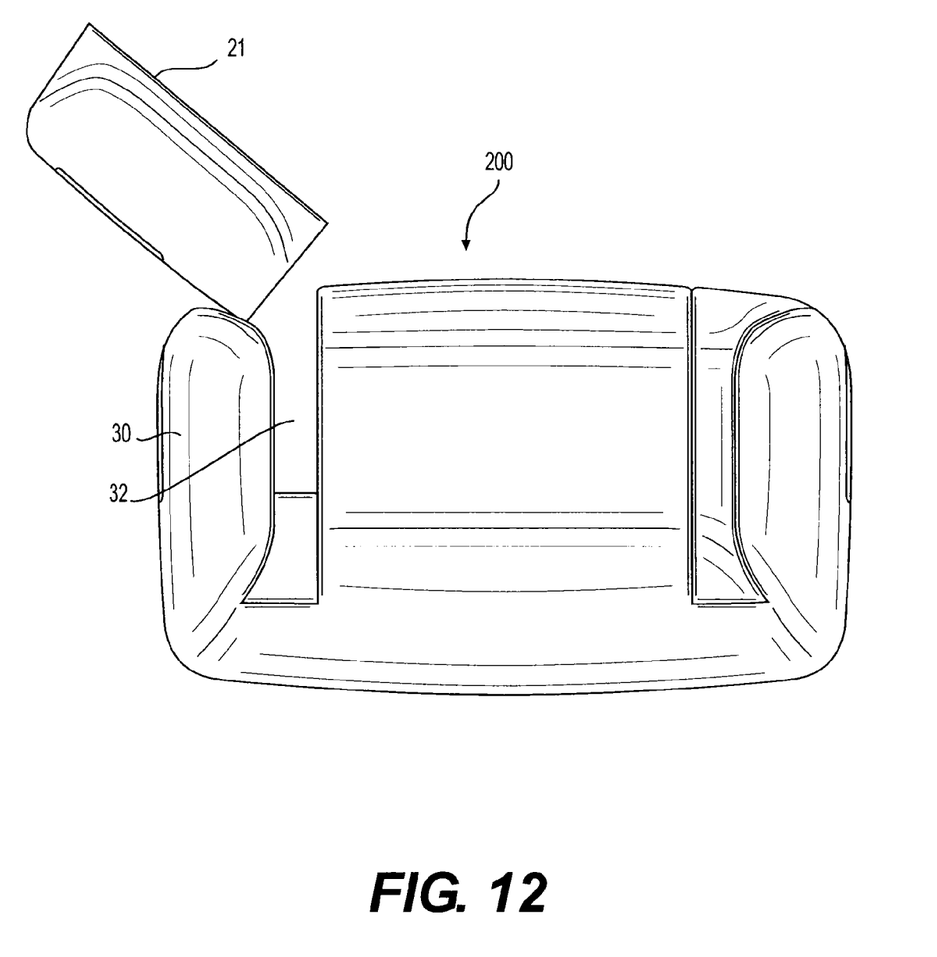
FIG. 12 illustrates a top view of a first embodiment of a comfort headrest assembly in accordance with the present disclosure.

FIG. 12 shows the top view of headrest assembly 200. The side wing 21 is extended and rotated out to one of the multiple positions it can be set to. The side wing 21 provides a pillow type object for users to rest their head without causing neck pain.

Figure 13:
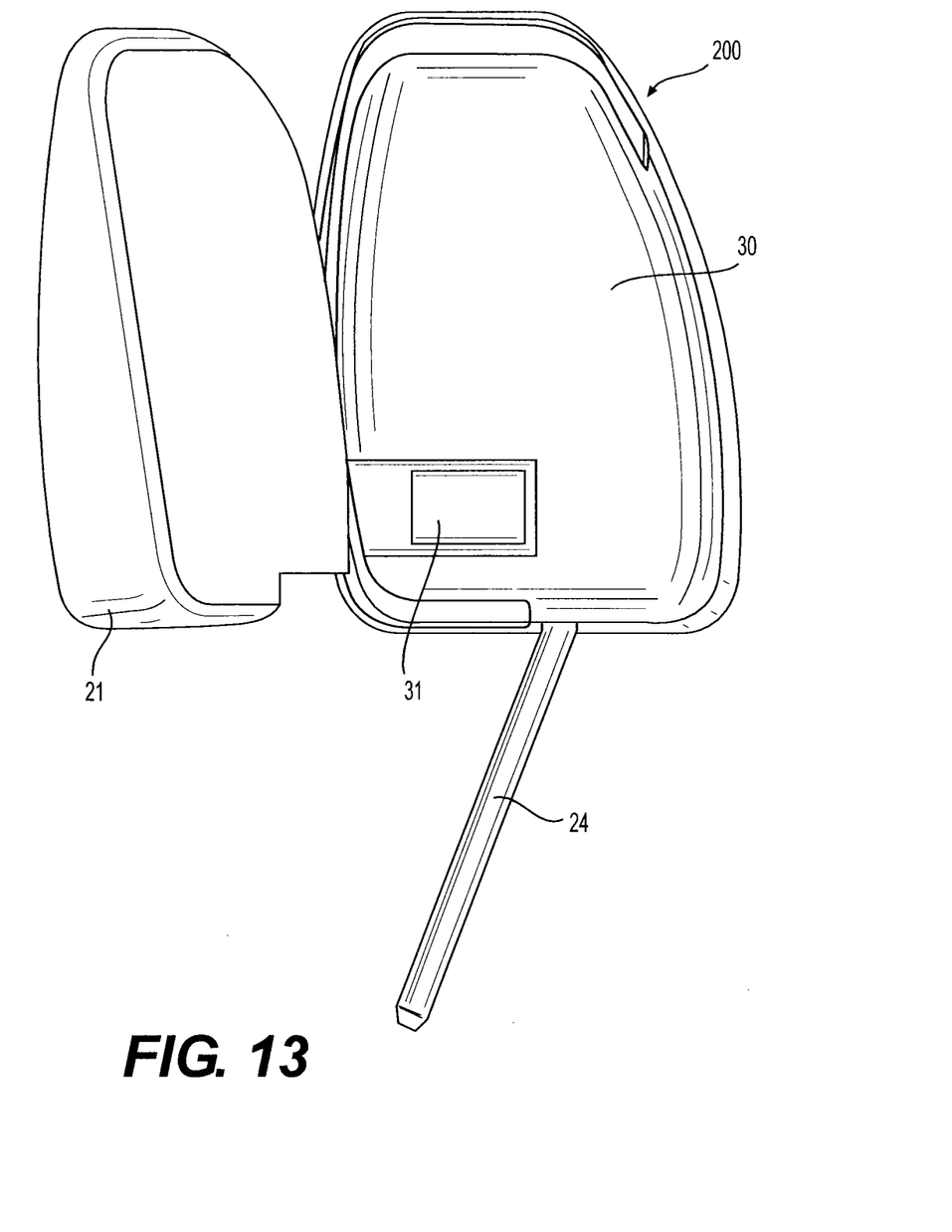
FIG. 13 illustrates a side view of a second embodiment of a comfort headrest assembly in accordance with the present disclosure.

FIG. 13 shows the side view of the headrest 200 with the side wing 21 extended and rotated. The side wall 30 that is fixed is also shown and provides a channel 32 to help guide the side wing 21 movement.

A third embodiment is similar to the first embodiment. The third embodiment includes two side wings that rotate towards the user's head and the backwards movement of the wings is restricted by a one way latch mechanism. The side wings can have fixed or infinite number of angle settings to which the side wings can be rotated to. To operate the side wings with the one way latch mechanism, the user just has to grab the side wing and rotate it around. To close the side wings the user has to pull side wings towards the head to a predetermined distance in order to disengage the latch mechanism. The benefit of the one way latch mechanism is the user does not have to lift side wing up to rotate around. Therefore, the movement is simpler for a user and possibly requires less effort.

A fourth embodiment includes two side wings that rotate towards the user's head by means of an electronic motor or actuator. The user can push a button to selectively open or close side wings to a desired angle.

Obviously, numerous modifications and variations of the present invention are possible in light of the above teachings. It is therefore to be understood that within the scope of the appended claims, the invention may be practiced otherwise than as specifically described herein.

The invention claimed is:

1. A vehicle headrest, comprising:
   two side wings at opposite ends of the headrest that rotate around respective axes;
   two posts on which the side wings are respectively mounted, the side wings rotating around axes of the posts; and
   a locking mechanism provided to a base of the headrest that respectively locks the side wings in one of a plurality of rotational locations around the axes, each locking mechanism including a plurality of predefined locking positions arranged at the rotational locations, the predefined locking positions each having a predetermined height in an axial direction of the axes,
   wherein the locking mechanism is unlocked when the side wings are moved greater than the predetermined heights of the predefined locking positions so that the side wings are free to rotate, and
   wherein the posts each include a first portion that extends upward from the base to which the side wings are respectively mounted, a second portion that extends downward from the base to an end of the post below the base, and a curved portion that joins the respective first and second portions.

2. The vehicle headrest of claim 1, wherein the side wings can be rotated independently and locked into one of the predefined locking positions by the locking mechanism.

3. The vehicle headrest of claim 1, wherein the side wings have a plurality of angle settings that the side wings can be rotated and locked into.

4. The vehicle headrest of claim 1, wherein the locking mechanism includes a moving mechanism to rotate the side wings by mechanical or electrical actuation.

5. The vehicle headrest of claim 1, wherein the side wings include a first position that is flush to a main portion of the headrest and a second position that protrudes from the main portion.

6. The vehicle headrest of claim 1, further comprising:
   a spring at an end of each of the posts,
   wherein the side wings compress the respective springs when the side wings are moved in the axial direction.

7. The vehicle headrest of claim 6,
   wherein the side wings each include a side wing structure that is movable relative to the respective posts, the side wing structure including an engagement portion that engages the locking mechanism, and
   wherein the respective locking mechanism is unlocked when the side wing structure compresses the spring and is moved relative to the post greater than the predetermined height so that the engagement portion clears the predefined locking position.

8. The vehicle headrest of claim 1, wherein the side wings each include a side wing structure that is movable relative to the respective posts, the side wing structure including an engagement portion that engages the locking mechanism.

* * * * *